US008706820B2

(12) United States Patent
Glover et al.

(10) Patent No.: US 8,706,820 B2
(45) Date of Patent: Apr. 22, 2014

(54) RULES EXTENSIBILITY ENGINE

(75) Inventors: Andrew Keith Glover, Duvall, WA (US); Long Zhou, Renton, WA (US); Anthony G Thane, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 12/028,619

(22) Filed: Feb. 8, 2008

(65) Prior Publication Data
US 2009/0204675 A1  Aug. 13, 2009

(51) Int. Cl.
G06F 15/16 (2006.01)
H04L 12/58 (2006.01)

(52) U.S. Cl.
CPC .................... *H04L 12/585* (2013.01)
USPC .......................... 709/206; 709/204

(58) Field of Classification Search
USPC .................................. 709/204–207
See application file for complete search history.

(56) References Cited

U.S. PATENT DOCUMENTS

| | | | |
|---|---|---|---|
| 5,802,253 A | | 9/1998 | Gross et al. |
| 5,917,489 A | * | 6/1999 | Thurlow et al. ............... 715/809 |
| 6,057,841 A | | 5/2000 | Thurlow et al. |
| 6,415,275 B1 | | 7/2002 | Zahn |
| 6,876,889 B1 | | 4/2005 | Lortz et al. |
| 7,080,142 B2 | | 7/2006 | Galloway et al. |
| 7,152,053 B2 | | 12/2006 | Serrano-Morales et al. |
| 2003/0212657 A1 | | 11/2003 | Kaluskar et al. |
| 2005/0015452 A1 | * | 1/2005 | Corson ......................... 709/206 |
| 2005/0021540 A1 | | 1/2005 | McKee et al. |
| 2007/0083929 A1 | * | 4/2007 | Sprosts et al. .................. 726/22 |
| 2007/0129953 A1 | | 6/2007 | Cunningham et al. |

OTHER PUBLICATIONS

"How to Use the Windows Workflow Rules Engine by Itself", at <<http://richardsbraindump.blogspot.com/2007/08/how-to-use-windows-workflow-rules.html>>, Richard Bank, 2007, pp. 6.
"RuleLab.Net Business Rules Engine (BRE)", available at least as early as Nov. 14, 2007, at <<http://www.metroid-only.com/soft/rulelab-net-business-rules-engine-bre.php>>, pp. 1.
Smallwood, "Email Management Hits Center Stage", available at least as early as Nov. 14, 2007, at <<http://www.imergeconsult.com/img/95RS.pdf>>, pp. 11.
"Windows Workflow: Rules and Conditions", at <<http://www.odetocode.com/Articles/458.aspx>>, OdeToCode.com, 2004, pp. 16.

* cited by examiner

*Primary Examiner* — Afshawn Towfighi
(74) *Attorney, Agent, or Firm* — Bryan Webster; Andrew Sanders; Micky Minhas

(57) ABSTRACT

Techniques described herein allow applications that are separate from a mail client to provide conditions and actions for rules to be run upon messages received by or sent from the mail client. That is, these techniques allow a user to create a rule that includes an action and/or a condition that is provided by an application that is separate from the mail client. This created rule may then be run upon either or both of messages received by or sent from the mail client. When a rule includes a condition or an action that is provided by a separate application, the mail client exposes the message to the separate application to allow the application to test the condition and/or perform the action. As such, these techniques allow applications to seamlessly create and provide conditions and actions that are tailored to each particular application.

20 Claims, 9 Drawing Sheets

RULES EXTENSIBILITY ENGINE

BACKGROUND

Traditional mail clients often provide users the opportunity to create one or more rules to apply to incoming or outgoing messages. These rules consist of one or more conditions and one or more actions. Traditional mail clients typically provide a fixed set of conditions and actions from which a user may create the one or more rules. For instance, a user may create a rule that plays a particular sound when the user receives a message from a particular email address. Here, the condition is that the incoming message comes from the user-specified email address, while the action comprises playing the user-specified sound. Other rules may include automatically moving incoming messages from a particular person or distribution list to a particular folder, deleting an incoming message that has particular words in the subject line, saving certain outgoing messages to a particular folder, and the like.

These rules have proven very useful in helping to manage users' mailboxes. Unfortunately, because the mail client itself provides all of the conditions and actions for these rules, the benefit of mail-client rules remains somewhat limited.

SUMMARY

This document describes tools for allowing applications that are separate from a mail client to provide conditions and actions for rules to be run upon messages received by or sent from the mail client. That is, these tools allow a user to create a rule that includes an action and/or a condition that is provided by an application that is separate from the mail client. This created rule may then be run upon either or both of messages received by or sent from the mail client.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

Figure 8:
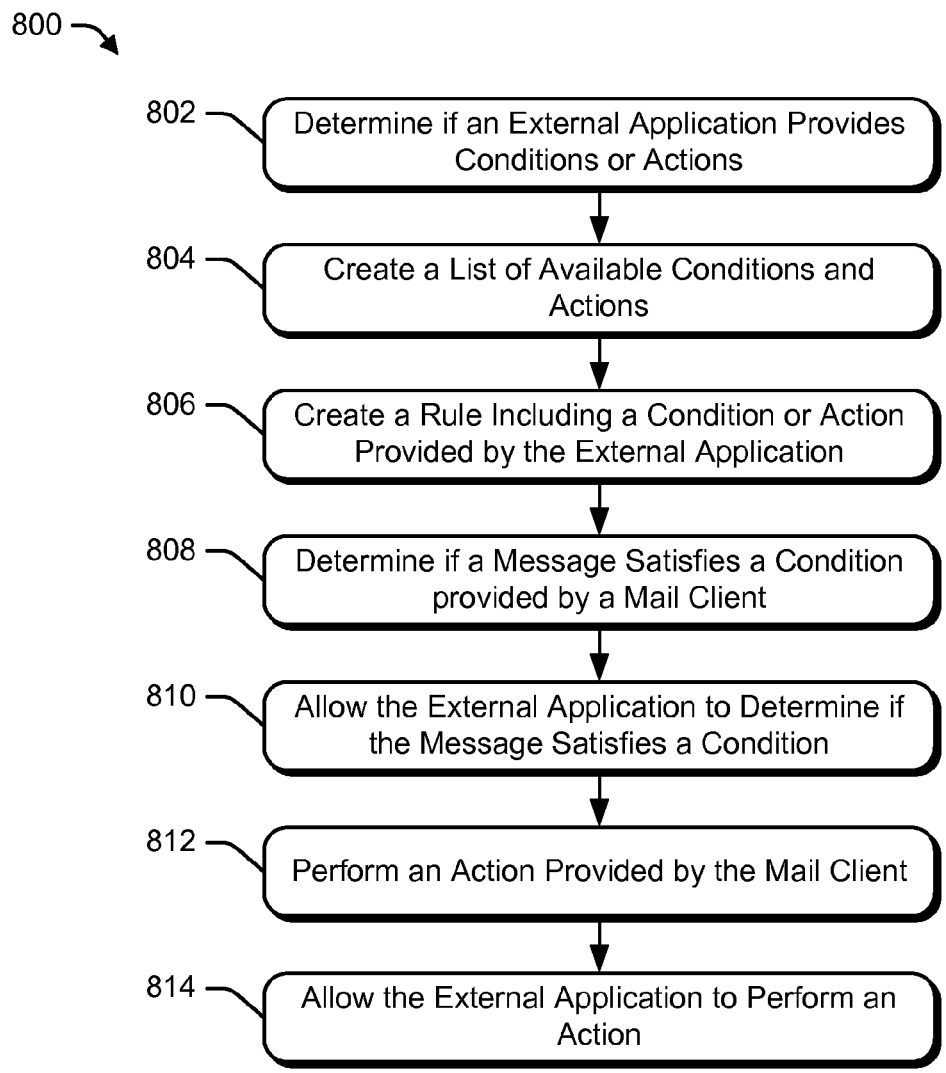
Figure 9:
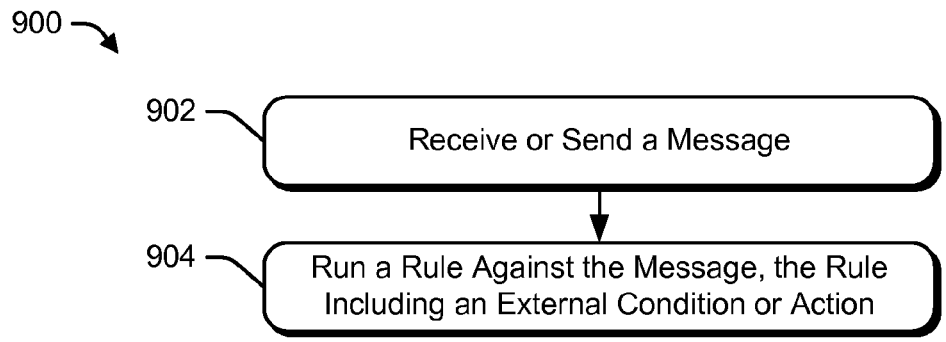
Figure 10:
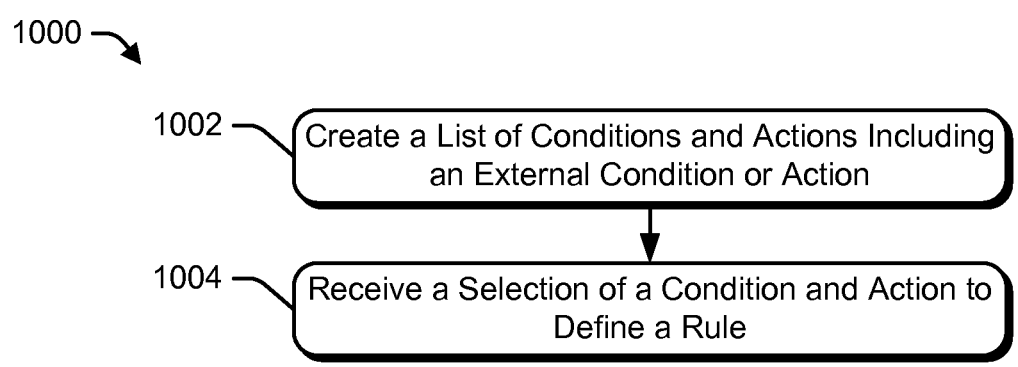

FIGS. 8-10 each depict other illustrative processes allowing creation of rules or running created rules against one or more received or sent messages.

DETAILED DESCRIPTION

This document describes tools for allowing applications that are separate from a communication application (e.g., a mail client) to provide conditions and actions for rules to be run upon communications (e.g., messages) received by or sent from the communication application. That is, these tools allow a user to create a rule that includes an action and/or a condition that is provided by an application that is separate from the communication application. This created rule may then be run upon either or both of communications received by or sent from the communication application. When a rule includes a condition or an action that is provided by a separate application, the communication application may expose the message to the separate application to allow the separate application to test the condition and/or perform the action. As such, these tools allow separate applications to seamlessly create and provide conditions and actions that are tailored to each particular separate application.

Additionally, by allowing applications other than the communication application to provide conditions and actions, the rules offered by the communication application to a user become extensible. These separate applications may therefore develop different conditions and actions, which may be installed on a user's computing device (or in another accessible location) upon or after the installation of the separate applications. The communication application, such as the mail client, will then offer these conditions and actions to a user for selection to allow the user to create rules with these application-provided conditions and actions. Additionally, the user may choose to create a rule that includes conditions or actions that the communication application provides, as well as conditions or actions that the separate application(s) provide.

The discussion begins with a section entitled "Illustrative Rules Extensibility Architecture", which describes one non-limiting environment that may implement the claimed tools. A section entitled "Illustrative Processes" follows. This section describes how separate or external applications may provide conditions and actions, as well as how rules that include such conditions or actions may be run against incoming or outgoing messages. A third and final section, entitled "Other Embodiments of the Tools", describes other processes for creating rules and/or running created rules against incoming or outgoing messages.

This brief introduction, including section titles and corresponding summaries, is provided for the reader's convenience and is not intended to limit the scope of the claims, nor the proceeding sections.

Illustrative Rules Extensibility Architecture

Figure 1:
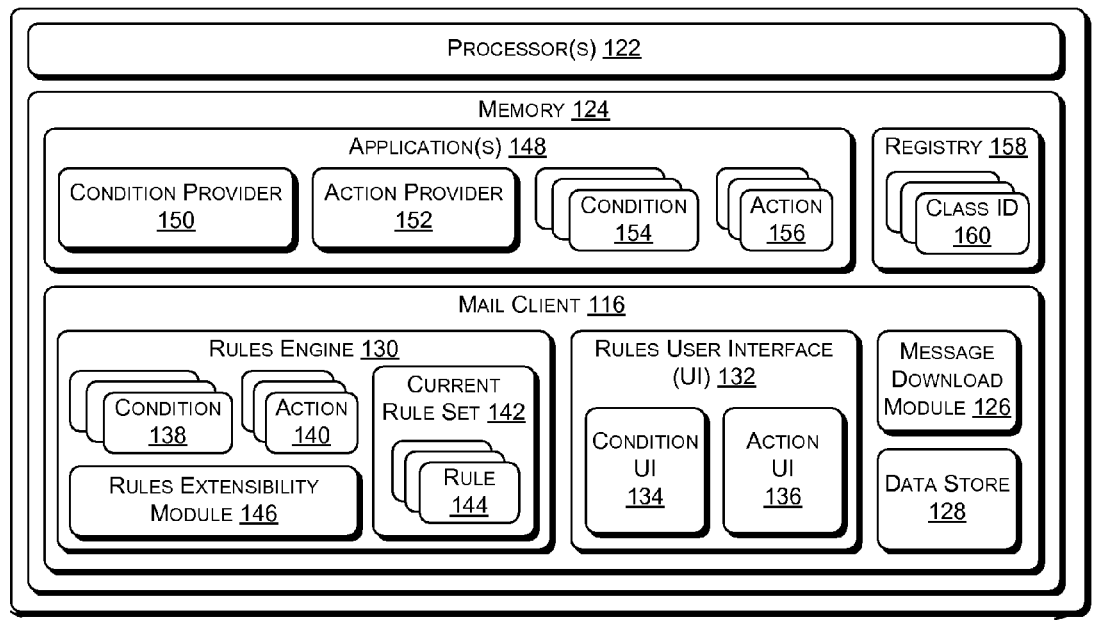
FIG. 1 depicts an illustrative architecture in which one or more applications that are separate from a mail client provide conditions and/or actions for use in creating rules for messages received by or sent from the mail client.
Figure 1:
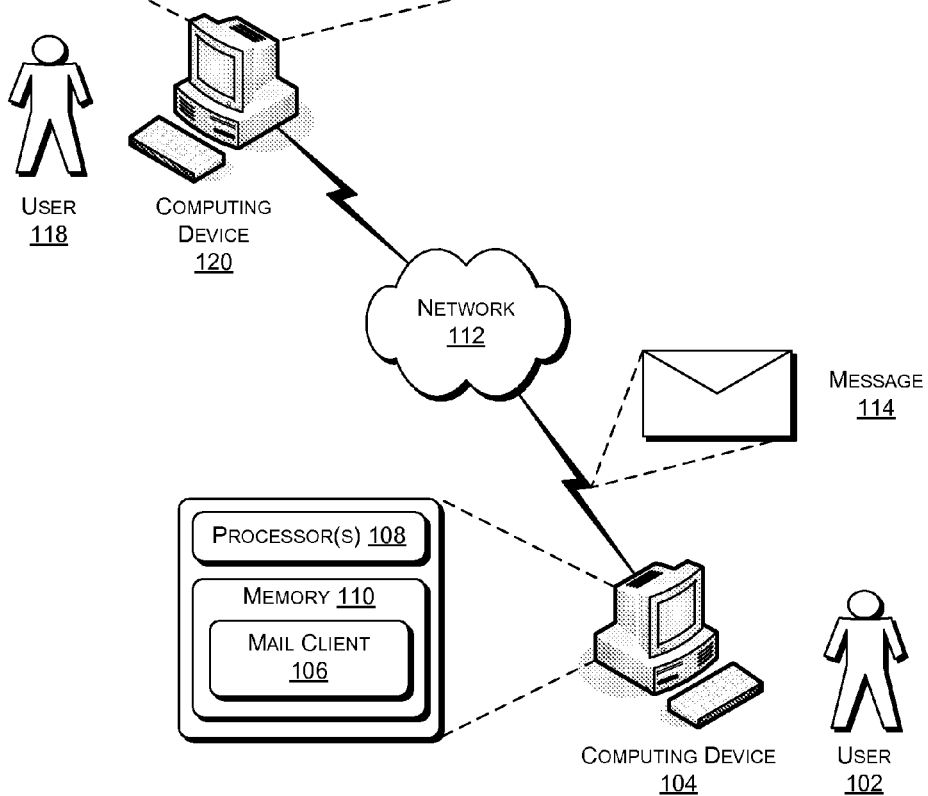

FIG. 1 depicts an illustrative architecture 100 that may employ the described rules extensibility techniques. As illustrated, FIG. 1 includes a user 102 operating a computing device 104 for the purpose of sending and receiving messages with use of a mail client 106. While FIG. 1 illustrates computing device 104 as a personal computer, other embodiments may employ laptop computers, mobile phones, set-top boxes, game consoles, personal digital assistants (PDAs), portable media players (PMPs) (e.g., portable video players (PVPs) and digital audio players (DAPs)), and the like.

Computing device 104 includes one or more processors 108, as well as memory 110, upon which mail client 106 resides. Although FIG. 1 illustrates mail client 106 as being stored in memory 110 (i.e., a desktop-based mail client), other embodiments may employ a mail client that is stored remotely (e.g., a web-based mail client). In some instances, mail client 106 sends and receives messages (e.g., email, Short Messaging Service (SMS) messages, real-time communications, etc.) to and from other mail clients.

Here, for instance, FIG. 1 illustrates that user 102 employs mail client 106 to send, via a network 112, a message 114 to a mail client 116 associated with a particular user 118. Similar to user 102 and mail client 106, user 118 operates a computing device 120 to access mail client 116 for purposes of sending and receiving messages, such as message 114. Note that network 112, which couples computing device 104 with computing device 120, may comprise the Internet, a Local Area Network (LAN), a Wide Area Network (WAN), a wireless network, and/or the like.

Similar to computing device 104, FIG. 1 illustrates that computing device 120 comprises a personal computer. Again, however, computing device 120 may comprise any other type of computing device. In the illustrated embodiment, computing device 120 includes one or more processors 122, as well as memory 124, upon which mail client 116 resides. Again, while FIG. 1 illustrates a desktop-based mail client, other embodiments may employ a mail client that resides remotely.

Either or both of mail clients 106 and 116 may allow for applications that are separate from the respective mail client to provide for conditions and/or actions for rules to be run upon incoming or outgoing messages. That is, while both of mail clients 106 and 116 may provide internal conditions and actions to create rules to run upon sent or received messages, either or both of mail clients 106 and 116 may additionally allow for separate or external applications to similarly provide these conditions or actions.

FIG. 1 depicts that, in the illustrated example, mail client 116 allows for these extensible conditions and actions and, hence, allows for extensible rules. As illustrated, mail client 116 includes a message download module 126, a data store 128, a rules engine 130, and a rule user interface (UI) 132. Message download module 126 receives incoming messages, such as message 114, and stores these messages in data store 128. Additionally, message download module 126 notifies rules engine 130 of the received message. As is known, data store 128 typically comprises a folder or location within memory 124 that is known to and accessible by mail client 116.

Once message download module 126 notifies rules engine 130 of message 114, rules engine 130 loads message 114 in order to run one or more active rules against the message. In order to do so, however, user 118 may previously have chosen to activate these one or more rules to run upon incoming messages. Additionally, user 118 may have activated one or more other rules to run upon outgoing or sent messages.

In order to active either of these types of rules, mail client 116 presents rules UI 132 to user 118 (via a display of computing device 120). As illustrated, rules UI 132 includes a condition UI 134 and an action UI 136. User 118 may employ these UIs to select one or more conditions and one or more actions to apply to incoming and/or outgoing messages. Note that user 118 may select these condition(s) and action(s) individually or, conversely, user 118 may select these condition(s) and action(s) by selecting a pre-existing rule presented by rules UI 132. However user 118 selects these condition(s) and action(s), such selection defines one or more rules for mail client 116 to run upon incoming and/or outgoing messages.

In order to run rules against incoming or outgoing messages, rules engine 130 here includes one or more internal conditions 138, one or more internal actions 140, a current rule set 142 storing one or more current rules 144, and a rules extensibility module 146. Here, mail client 116 itself provides conditions 138 and actions 140 (although it need not). Conditions 138 may include a name of particular sender(s) or addressee(s), a message conversation, a date, or the like. Actions 140, meanwhile, may include saving a message in a particular folder, deleting a message, forwarding a message to a particular addressee, or the like. For instance, user 118 may create a rule by selecting and customizing a condition and an action, respectively, with the created rule stating: "save any message received from user 102 in folder X".

Current rule set 142, meanwhile, stores any rules 144 that user 118 has created, such as the illustrative rule discussed immediately above. Therefore, when a message, such as message 114, is received, any of rules 144 that are assigned to incoming or received messages are run upon the received message. To run the rule, the condition(s) of the particular rule are tested against the message and, if the message satisfies the condition(s), the action(s) of the rule are performed.

Rules extensibility module 146, meanwhile, enables mail client 116 to create rules having condition(s) and/or action(s) that are provided by applications that are separate from or external to mail client 116. Therefore, rules 144 of current rule set 142 may includes rules having condition(s) and action(s) provided by mail client 116, by one or more external applications, and/or by a combination thereof.

To create these rules, FIG. 1 further illustrates that memory 124 includes an application 148 that is separate from or external to mail client 116. This application may comprise any sort of application, such as a photo management application, a word processing application, a drawing application, or the like. While FIG. 1 illustrates a single application, memory 124 may further store multiple other applications that may also offer condition(s) and/or action(s). Each of these applications may include one or more conditions and/or one or more actions that user 118 may employ when creating rules to run upon incoming or outgoing messages, such as received message 114.

As illustrated, application 148 includes a condition provider 150, an action provider 152, one or more conditions 154, and one or more actions 156. Condition provider 150 functions, amongst other things, to inform mail client 116 of the application's available conditions 154, as described in detail with reference to FIGS. 4-6. Similarly, action provider 152 functions to inform mail client 116 of the application's available actions 156. When mail client 116 becomes aware of conditions 154 and actions 156, mail client 116 may offer these conditions and actions (in addition to internal conditions 138 and actions 140) to user 118 for the user's use in creating rules 144.

In one non-limiting example, application 148 comprises a photo management application that allows user 118 to view, organize, and edit digital photographs stored in memory 124. Here, the photo management application may include a condition that queries whether, for instance, a received message, such as message 114, includes a digital photograph. The application may, for instance, examine an attachment of message 114 to determine whether the format of the attachment corresponds to a digital photograph format (e.g., JPEP, GIF, TIFF, etc.). The application may also examine the body of the message itself.

Additionally, the photo management application may include an action that saves digital photographs to a certain location within memory 124, such as a location that is accessible by the photo management application. If user 118 creates a rule that consists of this illustrative condition and action, then the application would strip and store digital photographs from any message received by mail client 116 in a location that is accessible by the photo management application. Therefore, when user 118 next opens the photo management application, any digital photographs recently sent to user 118 via a received message would be stored in and viewable by the photo management application.

In other embodiments, application 148 may comprise a word processing application. Here, the word processing application may provide a condition that queries whether a sent or received message includes a word processing document by, for example, checking the format of any attachments. The application may also provide an action that saves any such word processing documents in a particular location, which may be accessible by the word processing application.

In yet other embodiments, application 148 may comprise a drawing application. Here, the drawing application may provide a condition that queries whether a sent or received message includes a drawing document by, for example, checking the format of any attachments. The application may also provide an action that saves any such drawing documents in a particular location, which may be accessible by the drawing application. In a non-limiting example, user 118 may combine this illustrative condition and action with a condition and action provided by mail client 116 to create the following rule: "for messages sent to user 102 and containing an attached drawing document, save the attached drawing document in a drawing application folder and in folder X".

Of course, it is to be appreciated that that these examples are merely illustrative and non-limiting, and that application 148 may comprise any other sort of application that may employ any other sort of condition(s) and/or action(s). Additionally, while FIG. 1 illustrates application 148 as being stored locally on computing device 120, the claimed techniques may similarly enable remote applications to provide conditions and/or actions to mail client 116 and user 118.

Finally, memory 124 is shown to include a registry 158. Registry 158 comprises a folder or location of memory in which certain configuration information is stored. Here, registry 158 may store one or more class identifiers (IDs) 160 for use in allowing mail client 116 to learn of external applications (e.g., application 148) that wish to offer conditions and/or actions for use in creating rules to run upon messages sent from or received by mail client 116. Specifically, class IDs 160 allow mail client 116 to learn of the condition and/or action provider(s) that each external application provides. As discussed in detail with reference to FIGS. 4-6, these applications such as application 148 may therefore store one or more class IDs 160 in registry 158. When mail client 116 loads, mail client 116 may access registry 158 and read any Class IDs 160 therein. With this information, mail client 116 may communicate with corresponding application(s) to create the providers in order to determine the conditions and/or actions provided by the external application(s).

Figure 2:
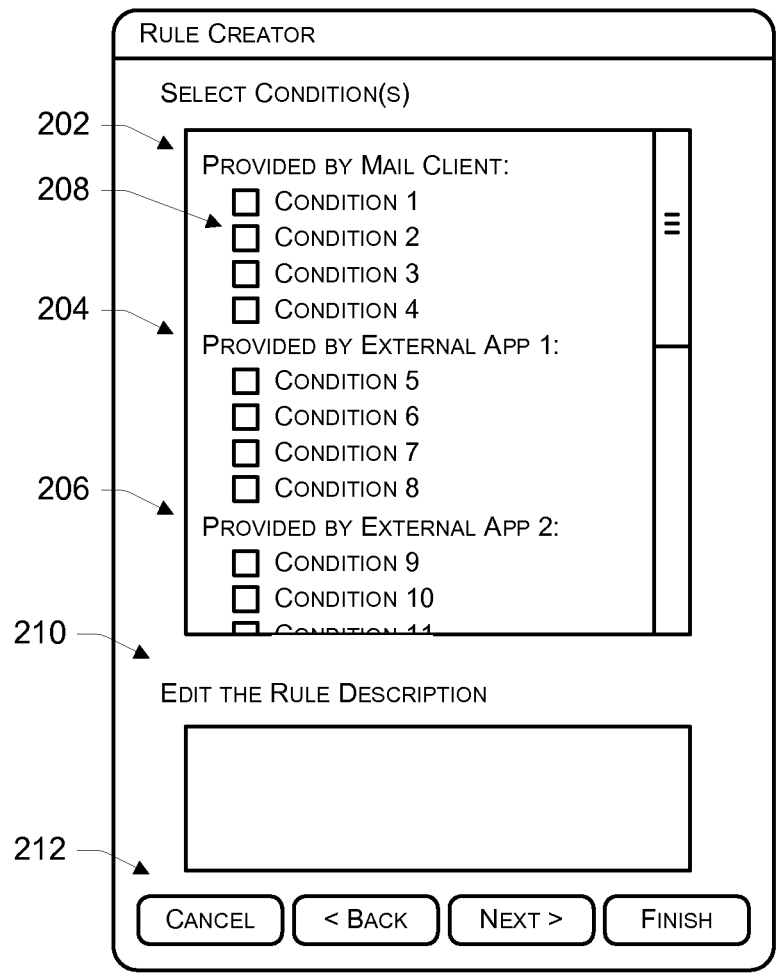
FIG. 2 depicts a portion of an illustrative user interface (UI) that allows a user to create a rule that includes a condition and/or an action that is provided by an application that is separate from the mail client. Here, the illustrated portion of the UI allows the user to select one or more conditions for a rule.

With architecture 100 in mind, FIG. 2 depicts an illustrative condition UI 134 from FIG. 1. As described above, condition UI 134 allows user 118 to select one or more conditions from a list of conditions for use in creating a rule to run upon sent or received messages. Condition UI 134 includes a list of conditions 202 provided by mail client 116, a list of conditions 204 provided by a first external application (e.g., application 148 of FIG. 1), and a list of conditions 206 provided by a second external application. Condition UI 134 also includes multiple checkboxes 208 to allow user 118 to select one or more of these conditions.

After lists 202, 204, and 206, condition UI 134 includes a text box 210 that allows user 118 to edit the rule description. Here, for instance, user 118 may edit the selected conditions. Imagine, for instance, that user 118 selects a condition that states: "from people or distribution list". Text box 210 may then be populated with this condition to allow user 118 to edit this condition in order to specify a particular email address or distribution list. Finally, condition UI 134 includes multiple icons 212 for navigating through rules UI 132.

Figure 3:
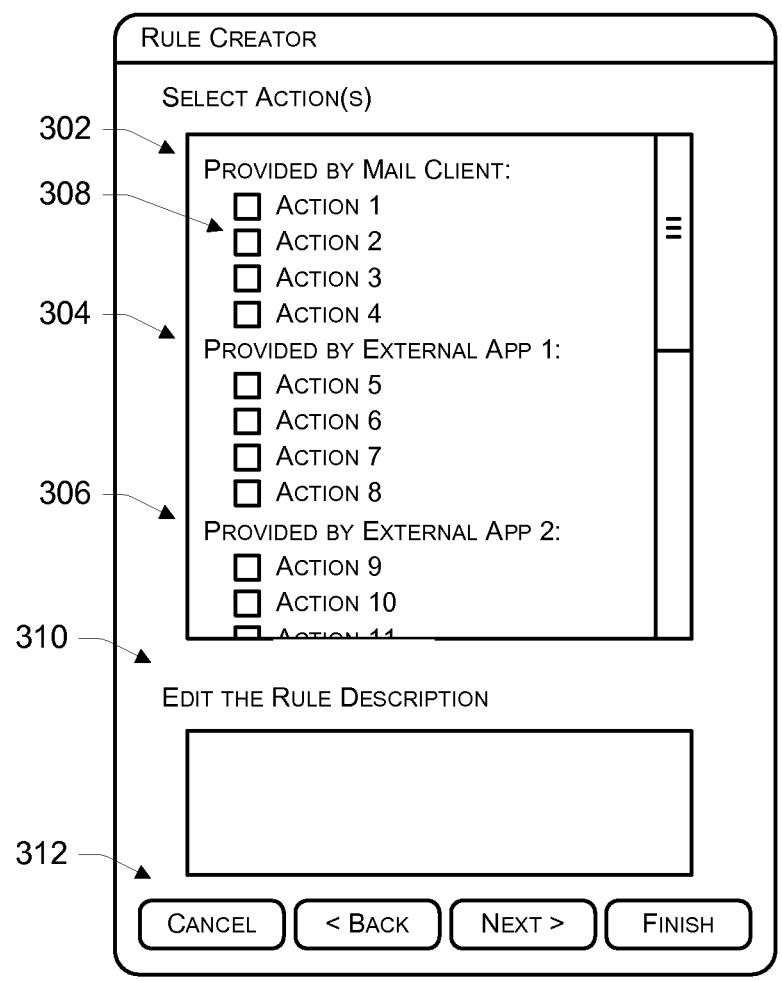
FIG. 3 depicts another portion of the illustrative UI. Here, the illustrated portion allows the user to select one or more actions for a rule.

After selection of one or more conditions from condition UI 134, rules UI 132 may present action UI 136. FIG. 3 depicts one such illustrative action UI 136. Action UI 136 includes a list of actions 302 provided by mail client 116, a list of actions 304 provided by a first external application (e.g., application 148 of FIG. 1), and a list of actions 306 provided by a second external application. Action UI 136 also includes multiple checkboxes 308 to allow user 118 to select these one or more actions.

Similar to condition UI 134, action UI 136 includes a text box 310 that allows user 118 to edit the rule description. Here, for instance, user 118 may edit the selected actions. Imagine, for instance, that user 118 selects an action that states: "save in specified folder". Text box 310 may then be populated with this action to allow user 118 to edit this action in order to specify a particular folder. Finally, action UI 136 also includes multiple icons 312 for navigating through rules UI 132.

Once user 118 has navigated through condition UI 134 and action UI 136, user 118 may choose to complete the creation of a rule to run upon sent or received messages. Again, this rule may include condition(s) and action(s) that are provided by mail client 116, by one or more external applications, or by some combination thereof. As such, mail client 116 includes a rules engine 130 that is extensible to allow for any sort of condition and/or action provided by any sort of application that is separate from or external to mail client 116.

Illustrative Processes

Figure 4:
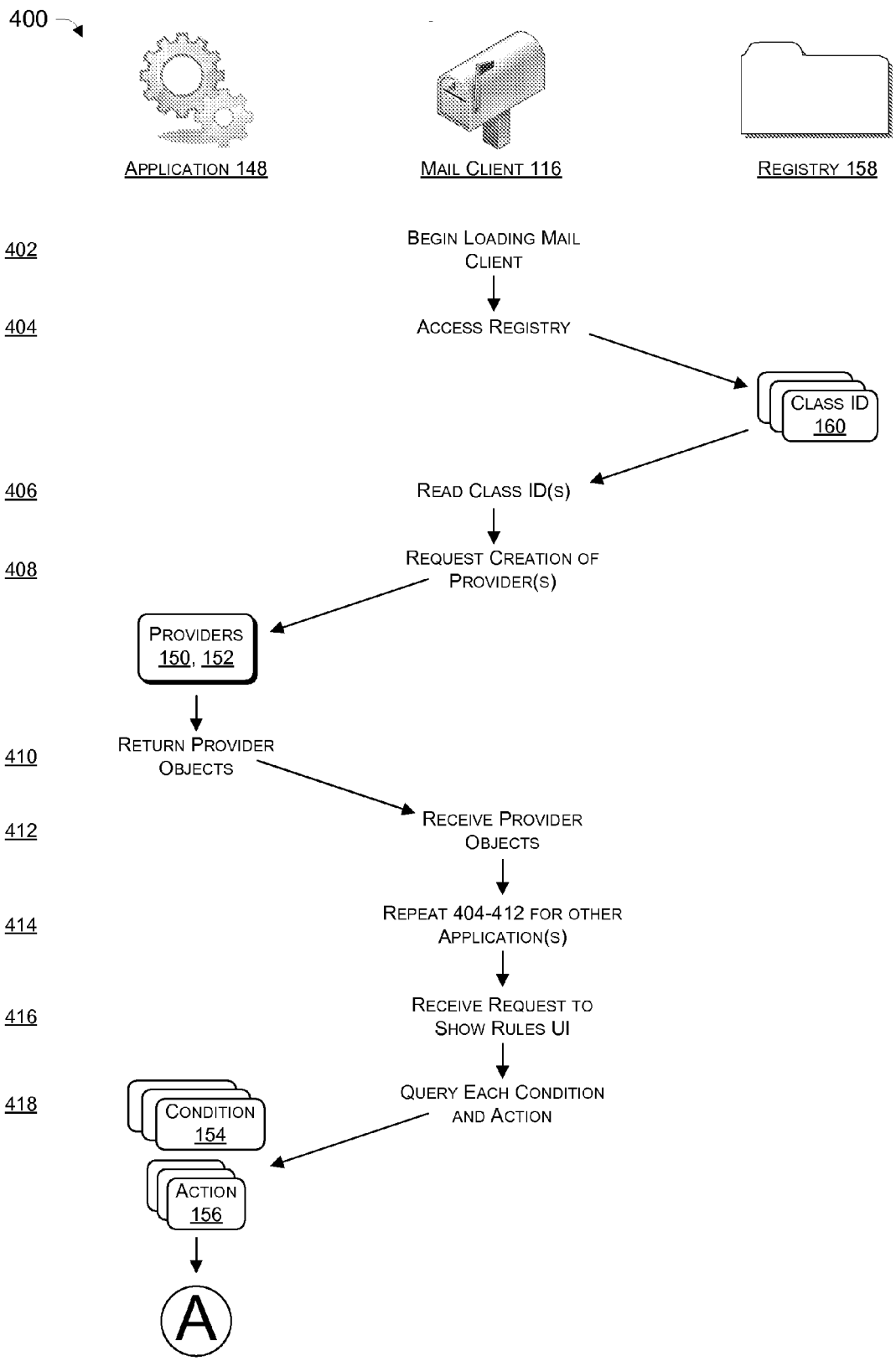
FIGS. 4-6 depict an illustrative process for enabling an application that is separate from the mail client to provide conditions and/or actions. The illustrative process also depicts running a rule upon a received message, the rule having both a condition and an action that is provided by the separate application.
Figure 5:
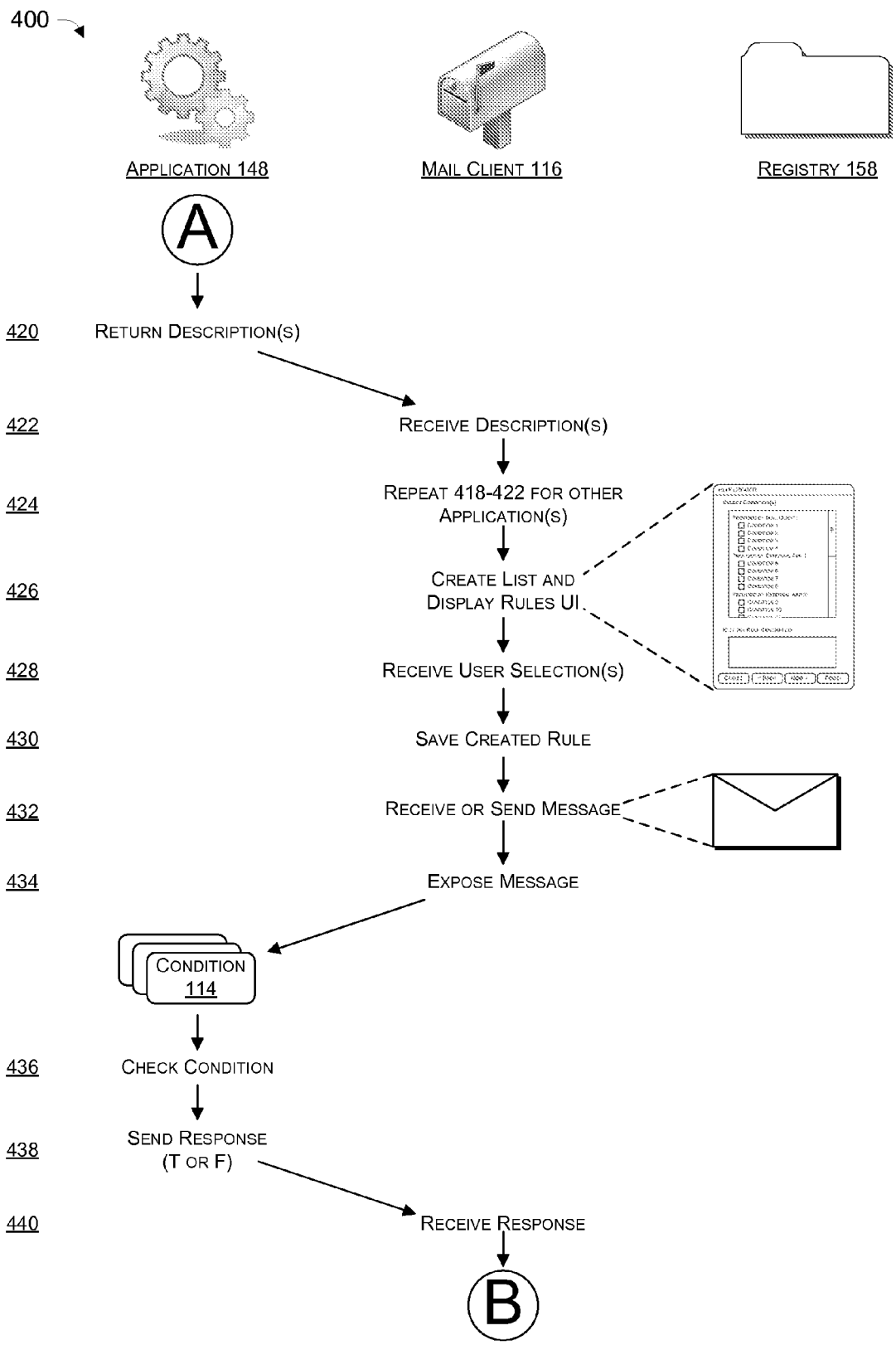
Figure 6:
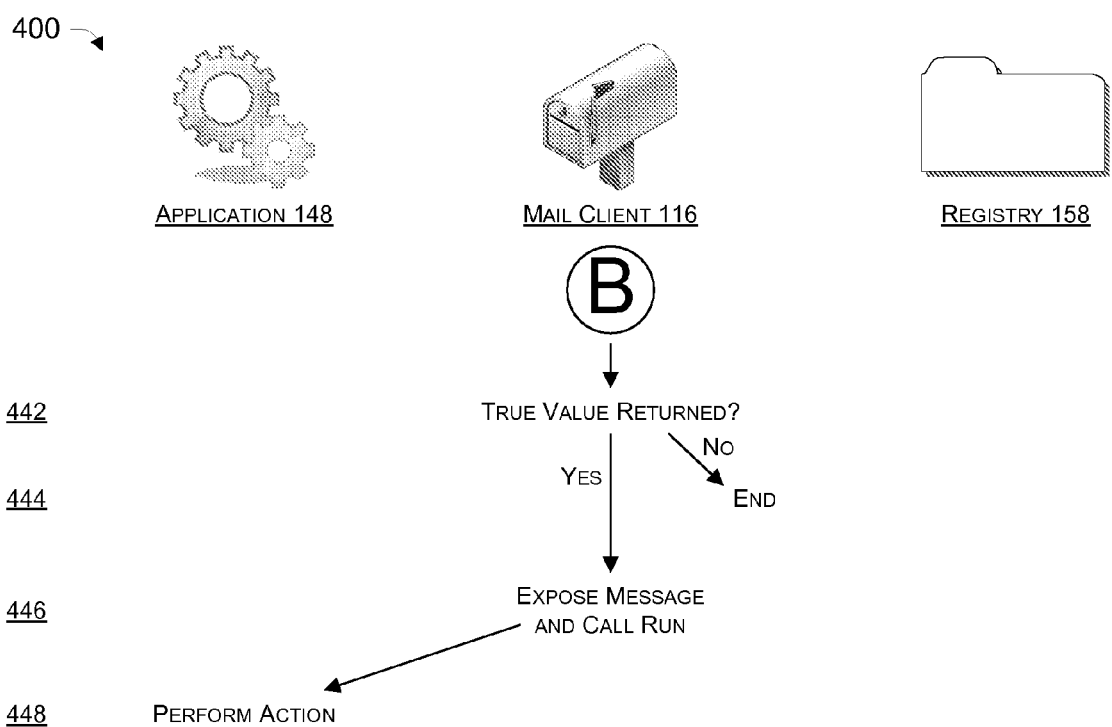

FIGS. 4-6 depict an illustrative process 400 for enabling an application that is separate from mail client 116 to provide conditions and/or actions. Process 400 also depicts running a rule upon a received message, the rule having both a condition and an action that is provided by the separate application.

Process 400, as well as other processes described throughout, is illustrated as a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, process 400 is described with reference to architecture 100 of FIG. 1, as well as application 148, mail client 116, and registry 158. Process 400 includes operation 402, which represents that mail client 116 begins to load (e.g., user 118 chooses to open mail client 116). At operation 404, mail client 116 accesses a predefined location in registry 158 and, at operation 406, reads class IDs 160 that the predefined location of registry 158 stores. As discussed above, external applications, such as application 148, store (e.g., upon installation of the application) class IDs 160 within the predefined location of the registry 158. These class IDs 160 signal to mail client 116 that the respective application would like to provide condition(s) and/or action(s) for use in creating rules for incoming or outgoing messages. Each class ID may generally corresponds to a condition provider or an action providers. Because each application may include more than one such provider, each application may store more than one class ID within registry 158.

After reading a class ID corresponding to providers 150 and 152 of application 148, mail client 116 requests creation of condition provider 150 and action provider 152 at operation 408 (e.g., via component object model (COM)). Note that because application 148 here provides both conditions and actions, mail client 116 requests creation of both respective providers. In instances where an external application (or a class ID associated with a provider of the external application) provides only conditions or only actions, however, then mail client 116 may request creation of the corresponding provider only.

After receiving the request to create the providers, application 148 may return the provider objects to mail client 116 at operation 410. That is, at operation 410, application 148 may return to mail client 116 a method of communicating with condition provider 150 and action provider 152, both of which reside within application 148. In some embodiments, application 148 may provide the following interfaces, which respectively correspond to condition provider 150 and action provider 152:

```
Interface IMailRuleConditionProvider
{
    HRESULT get_Count(ULONG* pCount);
    HRESULT item(ULONG i, IMailRuleCondition* pCondition);
};
Interface IMailRuleActionProvider
{
    HRESULT get_Count(ULONG* pCount);
    HRESULT item(ULONG i, IMailRuleCondition* pCondition);
};
```

Once mail client 116 receives the provider objects at operation 412, mail client 116 may call into condition provider 150 to determine the conditions 154 provided by application 148. Mail client 116 may also call into action provider 152 to determine the actions 156 provided by application 148. Operation 414, meanwhile, represents that operations 404-412 repeat for any other applications that have class IDs stored within the predefined location of registry 158.

Next, operation 416 represents receiving a request to show rules UI 132. For instance, user 118 may have sent a request to mail client 116 to view rules UI 132 in order to create a rule. In response to this received request, mail client 116 queries each condition and each action associated with condition provider 150 and action provider 152, respectively, at operation 418.

Process 400 continues with operation 420 at FIG. 5, wherein application 148 returns the description of each condition and each action that application 148 provides (or at least each condition and each action corresponding to condition provider 150 and action provider 152). Mail client 116 receives the descriptions at operation 422. Next, operation 424 represents that operations 418-422 repeat for other applications that are currently providing condition(s) and/or action(s).

At operation 426, mail client 116 creates a list of conditions and actions, the list including both conditions and actions provided by mail client 116 and conditions and actions provided by application 148 (and, potentially, other applications). Also at operation 426, mail client 116 displays rules UI 132 to user 118, with the displayed UI including the description of the conditions and actions provided by application 148. After viewing the displayed UI, user 118 selects (either individually or via a previously-compiled rule) one or more conditions and/or one or more actions to define a rule. Mail client 116 receives the user selection(s) at operation 428 and saves the created rule at operation 430.

In the current example, imagine the created and saved rule consists of a single condition and a single action, both of which application 148 provides. Additionally, imagine that user 118 has selected this rule to run upon incoming or received messages. With this in mind, operation 432 receives a message, such as message 114 from FIG. 1. Mail client 116 then runs the rule upon the received message. When mail client 116 does so, mail client 116 determines that the created rule includes a single condition, which application 148 provides.

Based upon this determination, mail client 116 exposes the received message 116 to application 148 at operation 434 to allow application 148 to determine whether the received message satisfies the condition of the rule. To do so, mail client 116 may provide the following interface to application 148, which may then make a call to determine information about the message:

```
Interface IMailRuleCondition
{
    HRESULT MatchesMessage(IMimeMessage* pMessage);
    HRESULT get_Description(BSTR* pbstrDescription);
};
```

At operation 436, application 148 makes a call and checks the condition and, at operation 438, sends a response comprising "true" or "false" to mail client 116. Application 148 sends a "true" value back to mail client 116 if the received message satisfies the condition of the rule. Conversely, application 148 sends a "false" value back to mail client 116 if the received message does not satisfy the condition of the rule. At operation 440, mail client 116 receives a response from application 148. While the illustrated embodiment describes mail client 116 exposing the message to allow the application that provides the condition to check the condition, mail client 116 (or some other actor) may itself check the condition in other embodiments.

Process 400 continues to FIG. 6, where mail client 116 queries, at operation 442, whether application 148 returned a "true" value to mail client 116. If mail client 116 determines that application 148 did not return a "true" value, then process 400 ends at operation 444 and no action is taken upon the message. If, however, mail client 116 determines that application 148 did return a "true" value, then process 400 continues to operation 446. Here, mail client 116 exposes the message to application 148 to allow application 148 to perform the action of the rule upon the message. To so allow application to take the appropriate action, mail client 116 may provide the following interface to application 148 and may call "run" in order to signal to application 148 to perform the action of the rule:

```
Interface IMailRuleAction
{
    HRESULT Run(IMimeMessage* pMessage);
    HRESULT get_Description(BSTR* pbstrDescription);
};
```

At operation 448, application 148 performs the action of the rule upon the received message. Again, while the illustrated embodiment describes mail client 116 exposing the message to allow the application that provides the action to perform the action, mail client 116 (or some other actor) may itself perform the action in other embodiments.

Figure 7:
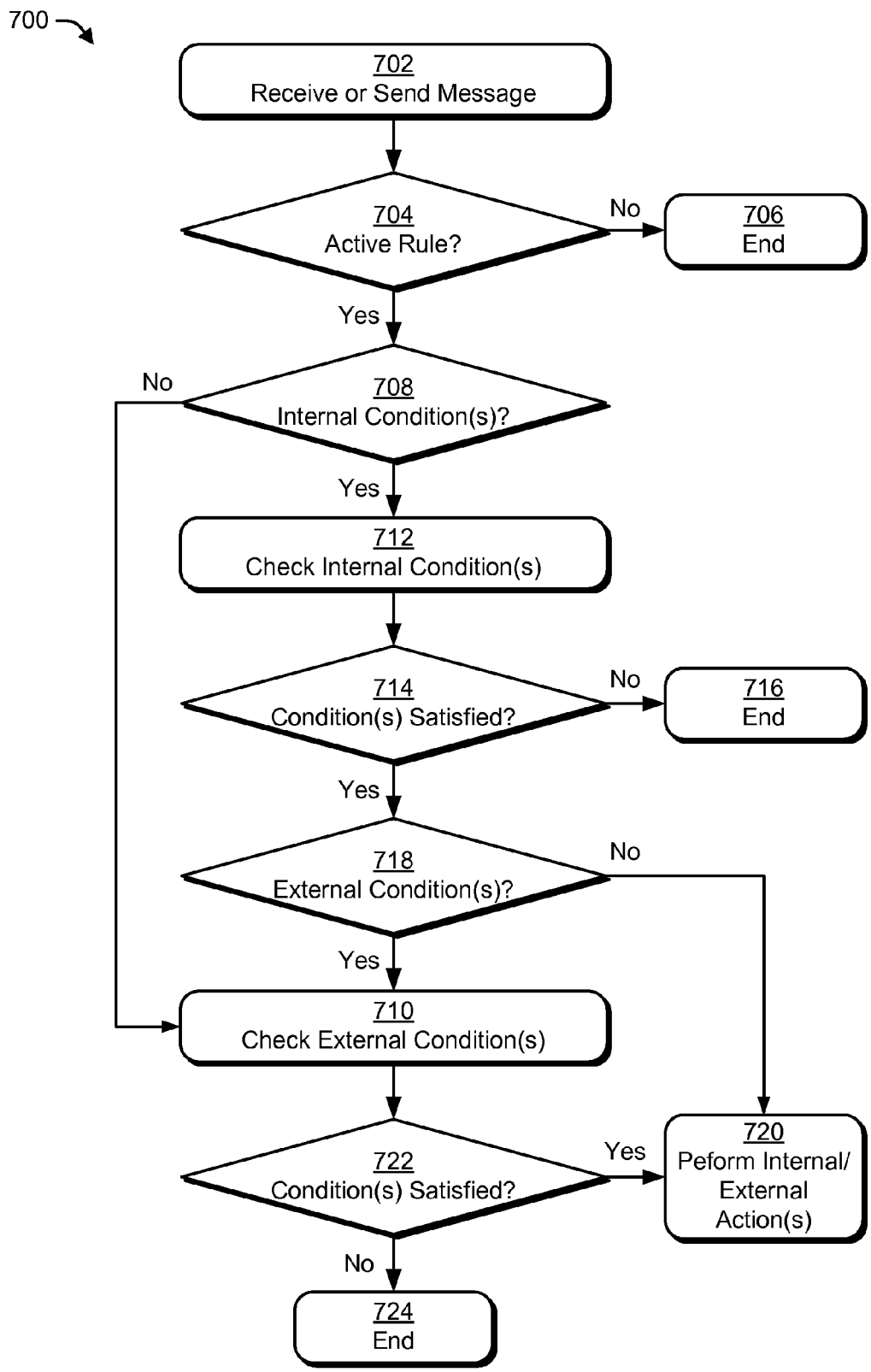
FIG. 7 depicts an illustrative process for running a rule upon a message that is received by or sent from a mail client.

FIG. 7 depicts an illustrative process 700 for running a rule upon a message that is sent from or received by mail client 116. As opposed to process 400, however, process 700 shows in greater detail how conditions provided by mail client 116 and conditions provided an external application may be tested. Additionally, process 700 shows in greater detail how actions provided by mail client 116 and actions provided by an external application may be executed. In short, process 700 may be implemented for relatively simple rules (e.g., having only one condition and one action, both provided by mail client 116) as well as for relatively complex rules (having multiple conditions and multiple actions, provided by mail client 116 as well as multiple external applications).

FIG. 7 includes operation 702, which represents receiving or sending a message, such as message 114 from FIG. 1. Operation 704 then queries whether mail client 116 currently includes an active rule (i.e., queries whether user 118 has selected a rule to run upon received and/or sent messages). If operation 704 determines that no active rules exist, then process 700 ends at operation 706. If, however, operation 704 determines that at least one active rule does exist, then process 700 proceeds to operation 708.

Operation 708 then queries whether the rule that is currently being analyzed includes any internal conditions (i.e., conditions provided by mail client 16 itself). If operation 708 determines that the rule does not, then process 700 proceeds to operation 710 to check the external conditions of the rule (e.g., the conditions provided by one or more external applications, such as application 148). If operation 708 determines that the rule does have one or more internal conditions, however, then process 700 proceeds to operation 712. At operation 712, the internal conditions of the rule are checked. Operation 714 then queries whether the received or sent message satisfies the internal conditions of the rule. If not, then process 700 ends at operation 716. If so, however, then process 700 continues to operation 718.

Operation 718 next queries whether the rule contains any external conditions. If not, then process 700 proceeds to operation 720 at which time the actions of the rule are performed. If the rule includes one or more internal action(s) (i.e., action(s) that mail client 116 provides), then mail client 116 may perform the action(s) upon the rule. Additionally, if the rule includes one or more external action(s) (i.e., action(s) that one or more external applications provide), then the external applications (or some other actor(s)) may perform the action.

If, however, operation 718 determines that the rule includes one or more external conditions, then operation 720 checks these conditions. Again, mail client 116 may expose the message to allow the external application(s) to test these conditions. In some other embodiments, mail client 116 or some other actor may instead or in addition test these conditions. Finally, operation 722 queries whether the message satisfies the external condition(s). If not, then process 700 ends at operation 724, and no action is performed upon the received or sent message. If so, however, then the action(s) of the rule is performed upon the message at operation 720. The external applications may perform respective external actions, while mail client 116 may perform any internal actions.

Other Embodiments of the Tools

Each of FIGS. 8-10 depict an illustrative process for allowing creation of rules or for running created rules against one or more received or sent messages. FIG. 8, for instance, depicts a process 800 for creating and running a created rule employing the techniques described above. Process 800 includes operation 802, which represents determining whether an application that is external to a mail client provides conditions or actions for use by the mail client in creating a rule. Next, operation 804 represents creating a list of available actions and conditions, the list including actions and conditions provided by the mail client and actions and conditions provided by the external application. Operation 806 then creates a rule to be run upon incoming messages, the rule including a condition and an action and at least one of the condition or the action being provided by the external application.

Responsive to receiving an incoming message at the mail client, operation 808 then determines if the incoming message satisfies a condition provided by the mail client if the created rule includes a mail client condition. Similarly, operation 810 allows the external application to determine if the incoming message satisfies a condition provided by the external application if the created rule includes an external application condition.

If the incoming message satisfies the condition of the rule, meanwhile, then operation 812 performs an action provided by the mail client upon the incoming message if the created rule includes a mail client action. Similarly, operation 814 allows the external application to perform an action provided by the external application if the created rule includes an external application action, and if the incoming message satisfies the conditions of the rule.

FIG. 9 illustrates a process 900 that includes operation 902, which represents receiving a message at or sending a message from a mail client. Operation 904, meanwhile, represents running a rule against the message, the rule including a condition and an action and at least one of the condition or the action being provided by an application that is separate from the mail client.

Finally, FIG. 10 illustrates a process 1000 for creating a rule using the techniques described above. Process 1000 includes operation 1002, which represents creating a list of conditions and actions available for selection when creating a rule to be applied to messages sent from or received by a mail client, the list including at least one condition or action that is provided by an application that is separate from the mail client. Next, operation 1004 represents receiving a selection of a condition and an action from the list to define a rule to be applied to the messages sent from or received by the mail client.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, executable on one or more processors, the method comprising:
   accessing a registry that is configured to store identifications of multiple applications that are each external to a mail client and that each provide a condition and/or an action for use by the mail client in creating rules;
   reading, from the registry, at least one of the identifications that corresponds to an external application of the multiple external applications, the at least one identification signaling to the mail client that the external application provides the condition and the action for use by the mail client in creating a rule, the external application and the mail client being stored in a memory of a computing device;
   responsive to determining that the external application provides the condition and the action for use by the mail client in creating the rule:
      receiving, from the external application, interfaces for communicating with a condition provider and an action provider of the external application to determine the condition and the action;
      creating a list of available actions and conditions, the list comprising at least the condition and the action provided by the external application;
      creating the rule to be run upon incoming messages, the rule including at least the condition and the action provided by the external application; and
   responsive to receiving an incoming message at the mail client:
      determining whether the incoming message satisfies the condition provided by the external application; and
      when the incoming message satisfies the condition provided by the external application:
         allowing the external application to perform the action provided by the external application.

2. The method as recited in claim 1, further comprising:
   displaying a user interface that includes the created list, the user interface allowing a user to create the rule to be run upon the incoming messages.

3. The method as recited in claim 1, wherein determining whether the incoming message satisfies the condition provided by the external application comprises providing an interface to the external application to enable the external application to determine whether the incoming message satisfies the condition provided by the external application.

4. The method as recited in claim 1, wherein allowing of the external application to perform the action comprises providing an interface to the external application to enable the external application to perform the action.

5. The method as recited in claim 1, wherein the external application comprises a first external application, and wherein the created list further includes a condition or an action that is provided by a second external application of the multiple applications.

6. The method as recited in claim 1, wherein the created list further includes a condition or an action that is provided by the mail client.

7. A computing device comprising:
   a processor;
   memory coupled to the processor;
   a mail client, stored in the memory and executable by the processor, to receive or send a message and to provide a first condition and a first action in a list for use by the mail client in creating a rule, the list indicating that the first condition and the first action are provided by the mail client, the mail client being further configured to:
      access a registry that is configured to store identifications of multiple applications that are each separate from the mail client and that each provide another condition and/or another action for use by the mail client in creating rules; and
      read, from the registry, at least one of the identifications that corresponds to an application of the multiple applications that is separate from the mail client, the at least one identification signaling to the mail client that the application that is separate from the mail client provides a second condition and a second action for use by the mail client in creating a rule;
   the application that is separate from the mail client, stored in the memory and executable by the processor, to provide the second condition and the second action in the list for use by the mail client in creating the rule, the list further indicating that the second condition and the second action are provided by the application that is separate from the mail client, and the rule including at least the second condition and the second action provided by the application that is separate from the mail client; and
   wherein, in response to receiving or sending the message by the mail client, the mail client is further configured to run the rule against the message.

8. The computing device as recited in claim 7, wherein the application that is separate from the mail client comprises a photo management application.

9. The computing device as recited in claim 7, wherein the application that is separate from the mail client comprises a photo management application, and wherein the rule comprises determining whether the message received by the mail client includes a digital photograph and, if so, saving the included digital photograph in a location that is accessible by the photo management application.

10. The computing device as recited in claim 7, wherein the rule further includes multiple conditions or multiple actions, and wherein the mail client provides a first portion of the multiple conditions or the multiple actions in the list for use by the mail client in creating the rule and the application that is separate from the mail client provides a second portion of the multiple conditions or the multiple actions in the list for use by the mail client in creating the rule.

11. The computing device as recited in claim 7, wherein the mail client comprises a desktop-based mail client or a web-based mail client.

12. The computing device as recited in claim 7, wherein running the rule comprises:
   allowing the application that is separate from the mail client to test the second condition of the rule against the message.

13. The computing device as recited in claim 7, wherein running the rule comprises:
   allowing the application that is separate from the mail client to perform, upon the message, the second action of the rule if the message satisfies the second condition of the rule.

14. A method, executable on one or more processors, the method comprising:
   accessing a registry that is configured to store identifications of multiple applications that are each separate from a mail client and that each provide a condition and/or an action for use by the mail client in defining rules;
   reading, from the registry, at least one of the identifications that corresponds to an application of the multiple applications that is separate from the mail client, the at least one identification signaling to the mail client that the application that is separate from the mail client provides the condition and the action for use by the mail client in defining a rule, the application that is separate from the mail client and the mail client being stored in a memory of a computing device;

creating a list of conditions and actions available for selection when creating the rule to be applied to messages received at or sent from the mail client, the list including at least the condition and the action that are provided by the application that is separate from the mail client;

receiving a selection of at least the condition and the action from the list to define the rule to be applied to the messages received at or sent from the mail client; and applying the rule to an incoming message.

15. The method as recited in claim 14, wherein the application that is separate from the mail client comprises a first separate application, and wherein the created list further includes a condition or an action that is provided by a second application that is also separate from the mail client.

16. The method as recited in claim 14, wherein creating the list comprises determining actions and conditions provided by the mail client.

17. The method as recited in claim 14, wherein the method further comprises:

receiving a message at or sending a message from the mail client;

providing an interface to the application that is separate from the mail client to allow the application that is separate from the mail client to determine whether the received or sent message satisfies the condition; and when the application that is separate from the mail client determines that the received or sent message satisfies the condition, providing an interface to the application that is separate from the mail client to allow the application that is separate from the mail client to perform the action.

18. The method as recited in claim 14, further comprising:

displaying a user interface that includes the created list to enable the selection of the condition and action from the list, the displayed user interface including a description of the condition or the action that is provided by the application that is separate from the mail client.

19. The method as recited in claim 14, further comprising:

receiving a message at or sending a message from the mail client; and exposing the received or sent message to the application that is separate from the mail client to allow the application that is separate from the mail client to test the condition against the received or sent message or to allow the application that is separate from the mail client to perform the action upon the received or sent message.

20. The method as recited in claim 14, wherein the condition is whether a message includes an attachment having a particular format and the action comprises saving the attachment to a predefined location if the condition is satisfied.

\* \* \* \* \*